US011016555B2

United States Patent
Lin

(10) Patent No.: US 11,016,555 B2
(45) Date of Patent: May 25, 2021

(54) CONTROL OF PERFORMANCE LEVELS OF DIFFERENT TYPES OF PROCESSORS VIA A USER INTERFACE

(71) Applicant: Advanced Micro Devices, Inc., Santa Clara, CA (US)

(72) Inventor: I-Ming Lin, Taipei (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 483 days.

(21) Appl. No.: 16/052,266

(22) Filed: Aug. 1, 2018

(65) Prior Publication Data
US 2018/0341317 A1 Nov. 29, 2018

Related U.S. Application Data

(63) Continuation of application No. 14/185,252, filed on Feb. 20, 2014, now Pat. No. 10,067,555.

(51) Int. Cl.
*G06F 1/3203* (2019.01)
*G06F 1/3293* (2019.01)
(Continued)

(52) U.S. Cl.
CPC .......... *G06F 1/3293* (2013.01); *G06F 1/206* (2013.01); *G06F 1/26* (2013.01); *G06F 1/3203* (2013.01);
(Continued)

(58) Field of Classification Search
None
See application file for complete search history.

(56) References Cited

U.S. PATENT DOCUMENTS 6,201,372 B1 3/2001 Green, Jr. et al.
6,215,275 B1 4/2001 Bean
(Continued)

FOREIGN PATENT DOCUMENTS

CN 1679218 A 10/2005
EP 1524829 A 4/2005
(Continued)

OTHER PUBLICATIONS

European Patent Office, International Search Report and Written Opinion dated Jun. 4, 2008 for PCT Application No. PCT/US2007/077125, pp. 1-13.
(Continued)

*Primary Examiner* — Paul Yen
(74) *Attorney, Agent, or Firm* — Faegre Drinker Biddle & Reath LLP

(57) ABSTRACT

An apparatus and a method for controlling power consumption associated with a computing device having first and second processors configured to perform different types of operations includes providing a user interface that allows, during normal operation of the computing device, at least one of: (i) a user selection of desired performance levels of the first and second processors relative to one another, such that higher desired performance levels of one processor correspond to lower desired performance levels of the other processor, and (ii) a user selection of a desired performance level of the first processor and a user selection of a desired performance level of the second processor, the two user selections being made independently of one another. The apparatus and method control, during normal operation of the computing device, performance levels of the processors in response to the one or more user selections of the desired performance levels.

20 Claims, 9 Drawing Sheets

(51) Int. Cl.
- *G06F 1/3234* (2019.01)
- *G06F 1/20* (2006.01)
- *G06F 1/26* (2006.01)
- *G06F 3/0484* (2013.01)

(52) U.S. Cl.
CPC ........ *G06F 1/3243* (2013.01); *G06F 3/04847* (2013.01); *Y02D 10/122* (2018.01); *Y02D 10/152* (2018.01); *Y02D 10/16* (2018.01)

(56) References Cited

U.S. PATENT DOCUMENTS

| | | |
|---|---|---|
| 6,236,674 B1 | 5/2001 | Morelli et al. |
| 6,263,200 B1 | 7/2001 | Fujimoto |
| 6,363,266 B1 | 3/2002 | Nonogaki |
| 6,442,700 B1 | 8/2002 | Cooper |
| 6,898,438 B1 | 5/2005 | Uchida |
| 6,978,374 B1 | 12/2005 | Hansen |
| 7,336,929 B2 | 2/2008 | Yasuda et al. |
| 8,135,443 B2 | 3/2012 | Aleksic et al. |
| 2002/0082059 A1 | 6/2002 | Nariai et al. |
| 2004/0041538 A1 | 3/2004 | Sklovsky |
| 2004/0141528 A1 | 7/2004 | Leblanc et al. |
| 2004/0247993 A1 | 12/2004 | Johnson et al. |
| 2004/0266493 A1 | 12/2004 | Bahl et al. |
| 2005/0070339 A1 | 3/2005 | Kim |
| 2005/0075069 A1 | 4/2005 | Higuchi |
| 2005/0085277 A1 | 4/2005 | Chen et al. |
| 2006/0166709 A1 | 7/2006 | Leech |
| 2006/0279256 A1 | 12/2006 | Bletsas |
| 2008/0057894 A1 | 3/2008 | Aleksic et al. |
| 2008/0104428 A1 | 5/2008 | Naffziger |
| 2012/0011377 A1 | 1/2012 | Yu |
| 2012/0054518 A1 | 3/2012 | Sadowski |
| 2012/0110352 A1 | 5/2012 | Branover |
| 2015/0170317 A1 | 6/2015 | Samson |
| 2015/0234450 A1 | 8/2015 | Lin |

FOREIGN PATENT DOCUMENTS

| | | | |
|---|---|---|---|
| EP | 1594232 A | | 11/2005 |
| FR | 2857195 A | | 1/2005 |
| JP | 10290195 A | | 10/1998 |
| JP | 2000253142 A | | 9/2000 |
| JP | 2000253587 A | | 9/2000 |
| JP | 2000357987 A | | 12/2000 |
| JP | 2001136679 A | | 5/2001 |
| JP | 2001274898 A | | 10/2001 |
| JP | 2001352394 A | | 12/2001 |
| JP | 2002199062 A | | 7/2002 |
| JP | 2005-117304 A | | 4/2005 |
| JP | 2006-050510 A | | 2/2006 |
| WO | 2000-039908 A | | 7/2000 |
| WO | 2004-105417 A | | 12/2004 |
| WO | 2005-006722 A2 | | 1/2005 |
| WO | 2005-009062 A | | 1/2005 |

OTHER PUBLICATIONS

Lenovo, ThinkVantage, "Power Manager Deployment Guide," Seventh Edition, Nov. 2012.

United States Patent and Trademark Office, Non-Final Rejection in U.S. Appl. No. 11/469,141 (related to above-captioned patent application), dated Jan. 13, 2010.

United States Patent and Trademark Office, Final Rejection in U.S. Appl. No. 11/469,141 (related to above-captioned patent application), dated Aug. 5, 2010.

United States Patent and Trademark Office, Advisory Action in U.S. Appl. No. 11/469,141 (related to above-captioned patent application), dated Oct. 14, 2010.

United States Patent and Trademark Office, Notice of Allowance in U.S. Appl. No. 11/469,141 (related to above-captioned patent application), dated Jan. 28, 2011.

United States Patent and Trademark Office, Notice of Allowance in U.S. Appl. No. 11/469,141 (related to above-captioned patent application), dated Jun. 10, 2011.

United States Patent and Trademark Office, Non-Final Rejection in U.S. Appl. No. 11/469,141 (related to above-captioned patent application), dated Aug. 30, 2011.

United States Patent and Trademark Office, Notice of Allowance in U.S. Appl. No. 11/469,141 (related to above-captioned patent application), dated Dec. 16, 2011.

United States Patent and Trademark Office, Non-Final Rejection in U.S. Appl. No. 14/185,252; dated Dec. 22, 2015.

United States Patent and Trademark Office, Final Rejection in U.S. Appl. No. 14/185,252; dated Jun. 7, 2016.

United States Patent and Trademark Office, Non-Final Rejection in U.S. Appl. No. 14/185,252; dated Oct. 25, 2016.

United States Patent and Trademark Office, Final Rejection in U.S. Appl. No. 14/185,252; dated Mar. 15, 2017.

United States Patent and Trademark Office, Non-Final Rejection in U.S. Appl. No. 14/185,252; dated Aug. 1, 2017.

United States Patent and Trademark Office, Final Rejection in U.S. Appl. No. 14/185,252; dated Jan. 16, 2018.

CONTROL OF PERFORMANCE LEVELS OF DIFFERENT TYPES OF PROCESSORS VIA A USER INTERFACE

CROSS-REFERENCE TO RELATED APPLICATIONS

This application is a continuation of U.S. patent application Ser. No. 14/185,252, filed on Feb. 20, 2014, having inventor I-Ming Lin, titled "CONTROL OF PERFORMANCE LEVELS OF DIFFERENT TYPES OF PROCESSORS VIA A USER INTERFACE", the contents of all which are incorporated by reference herein for all that it discloses.

BACKGROUND OF THE DISCLOSURE

The disclosure relates generally to controlling power consumption and more particularly to controlling power consumption associated with a computing device having a first processor and a second processor.

Common computing devices include multiple processors that are configured to perform different types of operations, such as a central processing unit (CPU) and a graphics processing unit (GPU). As known in the art, a CPU is primarily responsible for executing instructions to perform general purpose operations, such as executing an operating system of the computing device and executing instructions for software applications supported by the computing device, which in turn may include performing data processing calculations supported by such software applications, etc. As further known in the art, the CPU may be in communication with a GPU, where the GPU may be configured for specialized processing of graphics information for display, such as by supporting highly parallel processing needed for real-time graphics processing.

Some computing devices provide an end user with the ability to adjust a desired performance level of a processor such as the CPU. The performance level of a processor may correspond to an operating frequency and/or an operating voltage of the processor, where higher operating frequencies and operating voltages generally correspond to better overall performance such as, for example, faster instruction execution times and, in the example of a GPU, higher-quality output graphics data. Some computing devices provide a graphical user interface (GUI) that allows a user to drag a slider or control bar to indicate the desired performance level of the CPU. Thus, the user may drag the slider or control bar to a position that indicates a particular percentage performance level as the desired performance level, and the operating frequency and/or operating voltage of the CPU may be adjusted accordingly. The computing device also automatically controls the performance level of the GPU based on factors such as a loading of the GPU. The actual power consumed by a processor operating at a particular performance level will vary based on the loading of the processor as affected by, for example, the number and type of instructions being executed or in a queue to be executed by the processor.

Additionally, some computing devices allow a user to prioritize the applications that are currently executing on the computing device so that, for example, the CPU and/or GPU will maintain a higher quality of service (QoS) with respect to those applications that are given higher priority levels in, for example, a low battery situation in which it is not possible to maintain an optimal QoS with respect to all applications executing on the computing device. The applications that the user specifies as higher priority may include applications that are more CPU-intensive, such as a spreadsheet program; applications that are more GPU-intensive, such as a video game; or a combination of the two. Such computing devices may automatically control the performance levels of the CPU and the GPU to, for example, increase a performance level of the CPU when the higher-priority applications are more CPU-intensive and increase a performance level of the GPU when the higher-priority applications are more GPU-intensive.

As the number and variety of computing applications continue to increase, it will be necessary to provide users with enhanced ability to directly control performance levels associated with processors that are configured to perform different types of operations, such as a CPU and a GPU, in order to allow optimal user experience. At the same time, it will be necessary to ensure that such enhanced ability for a user to directly control performance levels associated with multiple processors does not result in operating conditions outside of those which the computing device is able to handle. For example, it will be necessary to ensure that such enhanced user control maintains control of power consumption associated with the processors so that an integrated circuit or circuits on which the processors are implemented does not consume more power than it is rated to consume.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
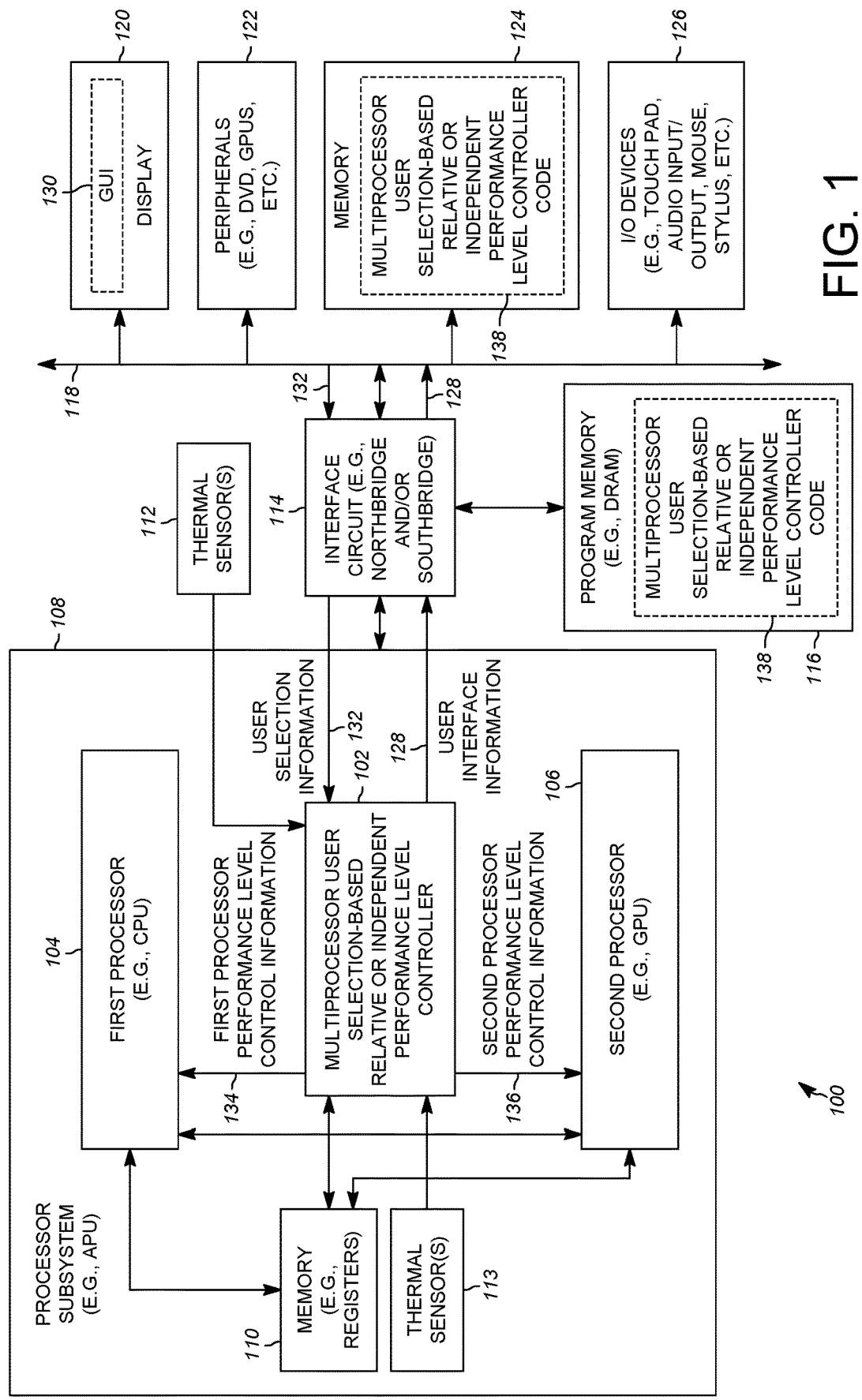
FIG. 1 is a functional block diagram illustrating a computing device including a multiprocessor user selection-based relative or independent performance level controller, in accordance with an example set forth in the disclosure.

Briefly, in one embodiment, an apparatus (e.g., a controller within a processor subsystem that also includes a CPU and a GPU) and a method for controlling power consumption associated with a computing device having first and second processors that are configured to perform different types of operations (e.g., where the first processor is a CPU and the second processor is a GPU) allow direct user control of performance levels of the first and second processors, such as by the user specifying desired percentage performance levels via the user interface and the apparatus and method then controlling the processors so that their performance levels are as indicated by the user but within certain constraints, such as die-level power constraints.

The apparatus and method may provide a user interface that allows at least one of: (i) a user selection of desired performance levels of the first processor and the second processor relative to one another, such that higher desired performance levels of one of the processors correspond to lower desired performance levels of the other processor, and (ii) a user selection of a desired performance level of the first processor and a user selection of a desired performance level of the second processor that is made independently of the user selection of the desired performance level of the first processor. For example, the user may be able to select, via control bars on a graphical user interface (GUI), the desired performance levels, and the selection of one desired performance level may not restrict the selection of the other desired performance level in any way. In some examples, the apparatus and method may provide the user interface so that the user may select the desired performance levels by selecting from among discrete performance states which each correspond to a particular operating frequency and operating voltage of a processor. In some examples, the apparatus and method may provide the user interface such that the user interface allows selection of desired percentage performance levels (e.g., a selection between 0 and 100 percent using a control bar), and the apparatus and method may map the desired percentage performance levels to, for example, desired performance states, such as by using a lookup table.

The apparatus and method may control performance levels of the first and second processors in response to the one or more user selections via the user interface. For example, the apparatus and method may generate control parameter information to control parameters such as the frequency and voltage of each processor in order to control the performance levels. The apparatus and method may control the performance levels by controlling discrete performance states that each may have a corresponding set of control parameters.

The apparatus and method may control or adjust at least one of the performance levels (which may be performed by adjusting the performance state of at least one of the first and second processors) relative to the selection(s) made via the user interface such that a combined power consumption level associated with the first and second processors is within a combined maximum power consumption level associated with the first and second processors. The combined power consumption level associated with the first and second processors may be, for example, a total power dissipated by an integrated circuit die on which the first and second processors are disposed. The combined maximum power consumption level associated with the first and second processors may be, for example, a die-level thermal design power (TDP) of an integrated circuit die on which the first and second processors are disposed. The die-level TDP may be, for example, a maximum allowable power dissipation of the integrated circuit die. Stated another way, the die-level TDP may be the amount of power the integrated circuit die needs to dissipate to prevent overheating. The apparatus and method may perform such control or adjustment in response to an overcurrent or overtemperature condition. The apparatus and method may perform such control or adjustment by reducing the at least one performance level based on a relative relationship between the desired performance levels.

Among other advantages, the apparatus and method allow enhanced user ability to directly specify, via a user interface such as a GUI, desired performance levels for each of a first processor (e.g., a CPU) and a second processor (e.g., a GPU), and allow such desired performance levels to be realized while still providing protection against exceeding, for example, a die-level TDP. Thus, the user is able to more fully customize his or her experience of various applications running on a computing device and take full advantage of the different capabilities afforded by the processors. In the absence of such direct control over the performance levels, the user might only realize such advantages in a limited and/or indirect manner, such as by specifying applications that are to be afforded higher priority but not actually being able to specify the desired performance levels of the processors. Other advantages of the subject matter disclosed herein will be recognized by those of ordinary skill in the art.

FIG. 1 is a functional block diagram illustrating a computing device 100 including a multiprocessor user selection-based relative or independent performance level controller 102 for providing a user interface that allows one or more user selections of desired performance levels for a first processor 104 and a second processor 106 and for controlling performance levels of the first and second processors 104 and 106 in response to the one or more user selections. The first processor 104 and the second processor 106 are configured to perform different types of operations. For example, the first processor 104 may be a CPU, and the second processor 106 may be a GPU. The multiprocessor user selection-based relative or independent performance level controller 102 may allow the one or more user selections of the desired performance levels of the processors 104 and 106 and control the performance levels in, for example, a normal mode of operation of the computing device 100, such as where the user is using one or more applications running on the computing device 100 (e.g., as opposed to a test mode of the computing device in which, for example, an engineer performs various test operations with respect to one or both of the first and second processors 104 and 106). The computing device 100 may be or may include any suitable device including but not limited to, for example, a video game console, a handheld device such as a smart phone, tablet, a portable device such as a laptop, desktop computer, high definition television, printer or copier, or any other suitable device.

The first and second processors 104 and 106 may be included within a processor subsystem 108. If desired, the processor subsystem 108 may be an accelerated processing unit (APU), which as known in the art includes one or more CPU cores and one or more GPU cores on the same die. Such an APU may be, for example, an APU as sold by Advanced Micro Devices, Inc. (AMD) of Sunnyvale, Calif. Alternatively, one or more of the first and second processors 104 and 106 may perform general-purpose computing on GPU (GPGPU), may include one or more digital signal processors (DSPs), one or more application-specific integrated circuits (ASICs), or the first and second processors 104 and 106 may be any suitable processors. The processor subsystem 108 may also include memory 110, such as on-chip registers, off-chip registers, or any suitable memory for storing, for example, parameters used in operations performed by the multiprocessor user selection-based relative or independent performance level controller 102.

The multiprocessor user selection-based relative or independent performance level controller 102 may receive the output(s) of one or more thermal sensors 112 and/or 113, which may include a temperature measurement of a chassis of the computing device 100 (e.g., from the thermal sensor(s) 112) and/or one or more temperature measurements (e.g., from the thermal sensor(s) 113) of the first processor 104, the second processor 106, and/or the processor sub system 108.

An interface circuit 114 may connect the processor subsystem 108 to a program memory 116, such as a dynamic random access memory (DRAM) that contains instructions and data for an executing software application. The interface circuit 114 may also connect the processor subsystem 108 to an expansion bus 118, which in turn may connect to, for example, a display 120; one or more peripheral devices 122 such as a Digital Versatile Disc (DVD) drive, an additional discrete GPU, etc.; an additional memory 124 which may be a RAM, a read only memory (ROM), or any suitable storage medium; and one or more input/output (I/O) devices 126 such as audio input/output devices, a mouse, a stylus, and/or any other suitable input/output device(s). The interface circuit 114 may be or may include a northbridge and/or a southbridge, as known in the art.

As shown in FIG. 1, the multiprocessor user selection-based relative or independent performance level controller 102 may provide user interface information 128 in order to provide a user interface such as, for example, a graphical user interface (GUI) 130 for display on the display 120. The multiprocessor user selection-based relative or independent performance level controller 102 may receive user selection information 132 during normal operation of the computing device 100 (e.g., in a non-test mode) indicating the desired performance levels of the first and second processors 104 and 106 from, for example, the I/O device(s) 126 or, for example, from the display 120 when the user interface is the GUI 130 and the display 120 is a touch panel display. The multiprocessor user selection-based relative or independent performance level controller 102 may then generate and provide first processor performance level control information 134 and second processor performance level control information 136 to the first and second processors 104 and 106, respectively.

The multiprocessor user selection-based relative or independent performance level controller 102 may be implemented as hardware; as software executing on one or more processors such as the first processor 104 and/or the second processor 106; as one or more processors in combination with executable code stored in memory as shown in FIG. 1 by the storage of multiprocessor user selection-based relative or independent performance level controller code 138 in the program memory 116 or, if desired, in the additional memory 124; or in any other suitable manner.

Figure 2:
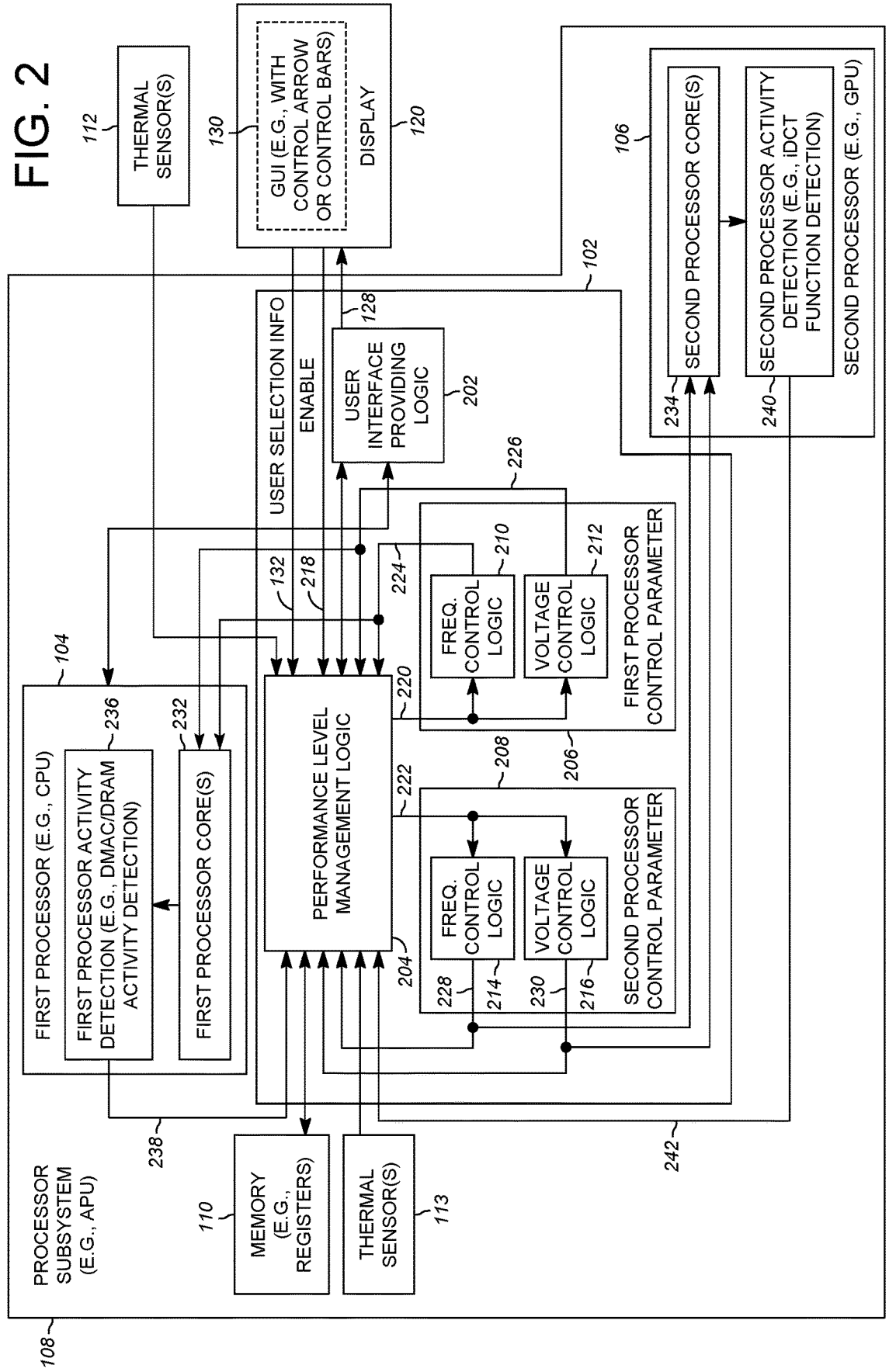
FIG. 2 is a functional block diagram illustrating an example of further detail of the multiprocessor user selection-based relative or independent performance level controller, in accordance with another example set forth in the disclosure.

FIG. 2 is a functional block diagram of a portion of the computing device 100 illustrating an example of further detail of the multiprocessor user selection-based relative or independent performance level controller 102. Certain components of the computing device 100 shown and described with reference to FIG. 1, such as the interface circuit 114 and the expansion bus 118, are omitted from FIG. 2 for ease of illustration and explanation. As shown in FIG. 2, the multiprocessor user selection-based relative or independent performance level controller 102 may include user interface providing logic 202, performance level management logic 204, first processor control parameter logic 206, and second processor control parameter logic 208. The first processor control parameter logic 206 includes first processor frequency control logic 210 and first processor voltage control logic 212, and the second processor control parameter logic 208 includes second processor frequency control logic 214 and second processor voltage control logic 216.

Figure 3:
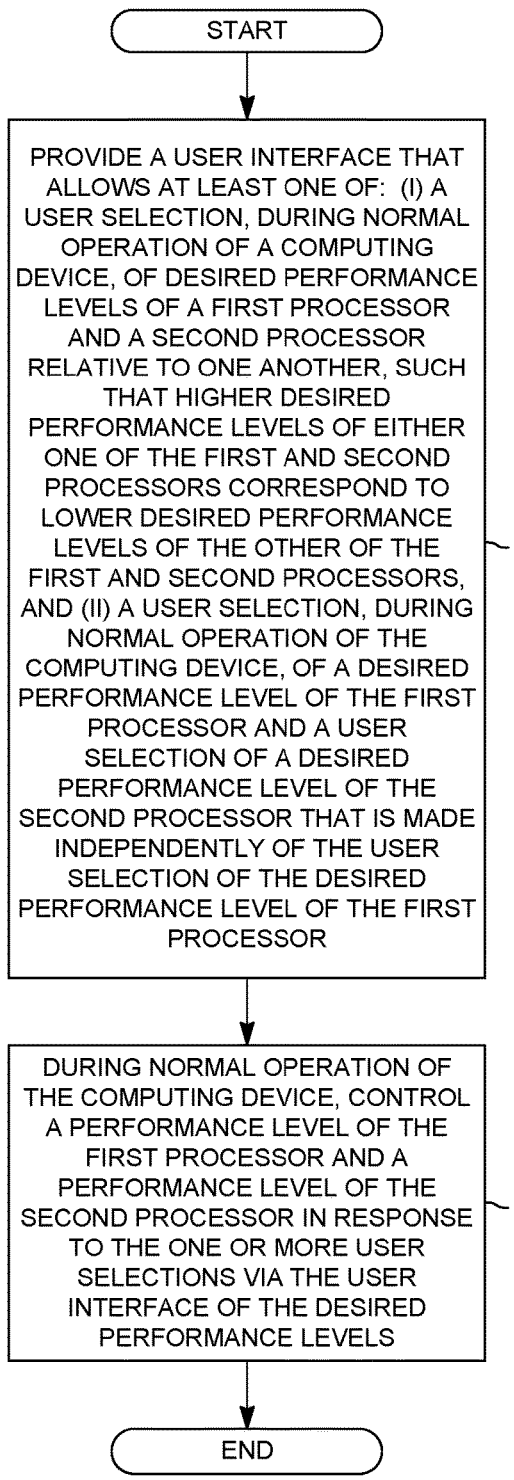
FIG. 3 is a flow chart illustrating an example of a method for controlling power consumption associated with a computing device having a first processor and a second processor that are configured to perform different types of operations, in accordance with yet another example set forth in the disclosure.
Figure 4:
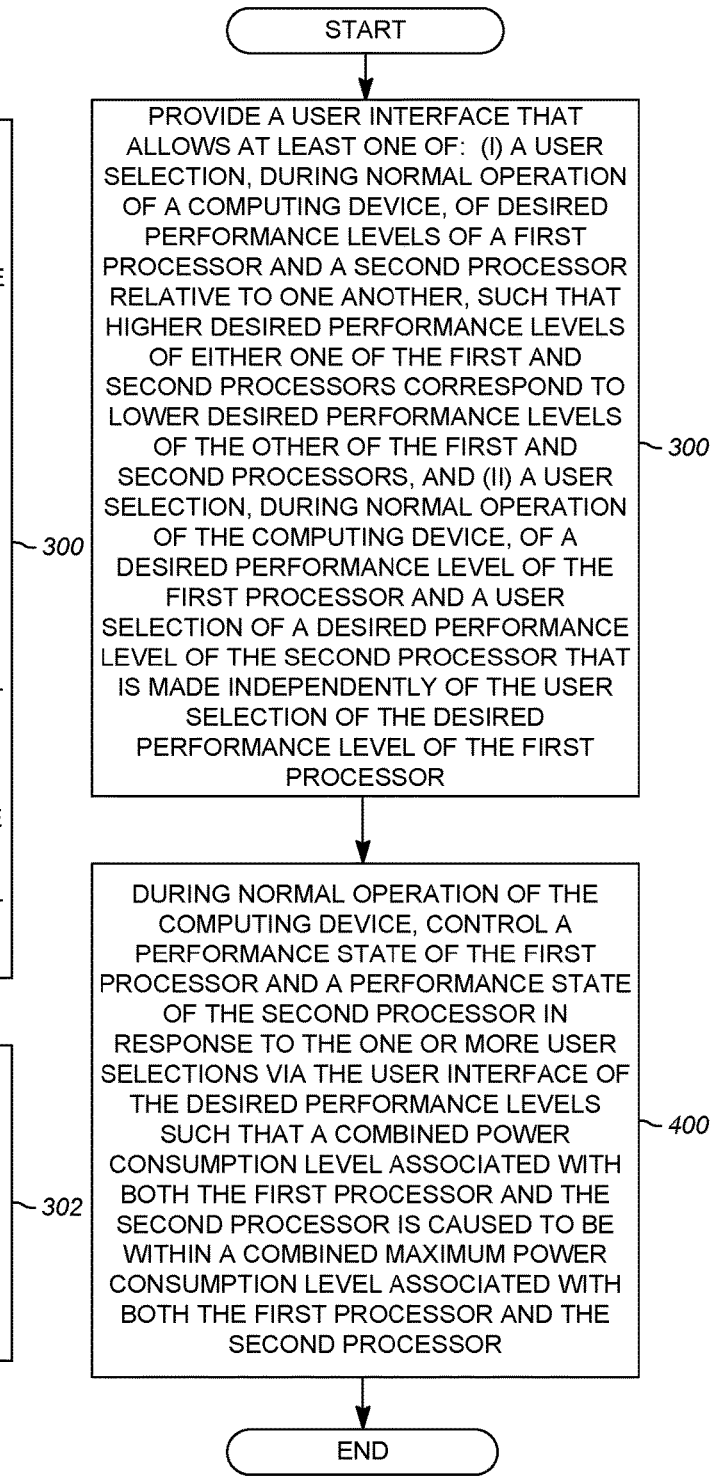
FIG. 4 is a flow chart illustrating another example of a method for controlling power consumption associated with a computing device having a first processor and a second processor that are configured to perform different types of operations, in accordance with still another example set forth in the disclosure.

The multiprocessor user selection-based relative or independent performance level controller 102 will be described further with reference to FIGS. 2, 3, and 4, where FIGS. 3 and 4 are flow charts illustrating examples of methods for controlling power consumption associated with a computing device having a first processor and a second processor that are configured to perform different types of operations, such as where the first processor 104 is a CPU and the second processor 106 is a GPU.

In one embodiment, as shown in block 300 of FIG. 3, the method includes providing a user interface that allows at least one of: (i) a user selection, during normal operation of the computing device 100 (e.g., as opposed to a test mode of the computing device in which, for example, an engineer performs various test operations with respect to one or both of the first and second processors 104 and 106) of desired performance levels of the first processor 104 and the second processor 106 relative to one another, and (ii) a user selection, during normal operation of the computing device 100, of a desired performance level of the first processor 104 and a user selection of a desired performance level of the second processor 106 that is made independently of the user selection of the desired performance level of the first processor 104. For example, the user interface providing logic 202 may provide the user interface information 128 in order to provide a user interface, such as the GUI 130 as displayed via the display 120. The user interface providing logic 202 may provide the user interface information 128 in response to, for example, a user selection of performance level control functionality, such as, by way of example, a "Power Manager" functionality, or a user selection of any other suitable functionality as detected by the first processor 104.

Figure 5:
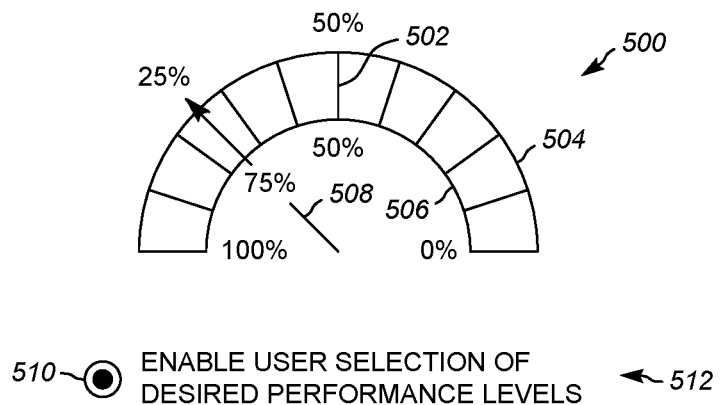
FIG. 5 illustrates an example of a graphical user interface that may be provided by a multiprocessor user selection-based relative or independent performance level controller, in accordance with another example set forth in the disclosure.

The GUI 130 may include a user-selectable component. For example, FIG. 5 illustrates an example GUI 500, which may be used to implement the GUI 130, that includes a selection portion 502. On one side of the selection portion 502 may be a first processor selection range 504, and on another side of the selection portion 502 may be a second processor selection range 506. The GUI 500 may also include a user-selectable component 508, which in this example is a control arrow. The user-selectable component 508 may take any other suitable form, such as a slider, a control bar, etc. The GUI 500 also includes an enable option 510, which may be a radio button as shown, and accompanying text 512 which may indicate the functionality of the enable option 510, such as by, in this example, reading "ENABLE USER SELECTION OF DESIRED PERFORMANCE LEVELS." With reference to FIG. 2, an enable signal 218 may be provided from the user interface (shown as the GUI 130) to the performance level management logic 204 in response to a user selection of the enable option 510.

As shown in FIG. 5, the first and second processor selection ranges 504 and 506 may each range from 0 percent to 100 percent, where the percentages are desired percentage performance levels. The user interface providing logic 202 may provide the GUI 500 such that any position of the user-selectable component 508 indicates the desired performance levels as percentages that add up to 100 percent. In the illustrated example, the user-selectable component 508 points to a position corresponding to a desired percentage performance level of 25 percent for the first processor 104 and 75 percent for the second processor 106. Thus, when the provided user interface allows a user selection of the desired performance levels relative to one another, higher desired performance levels of either one of the first and second processors 104 and 106 correspond to lower desired performance levels of the other one of the first and second processors 104 and 106.

Figure 6:
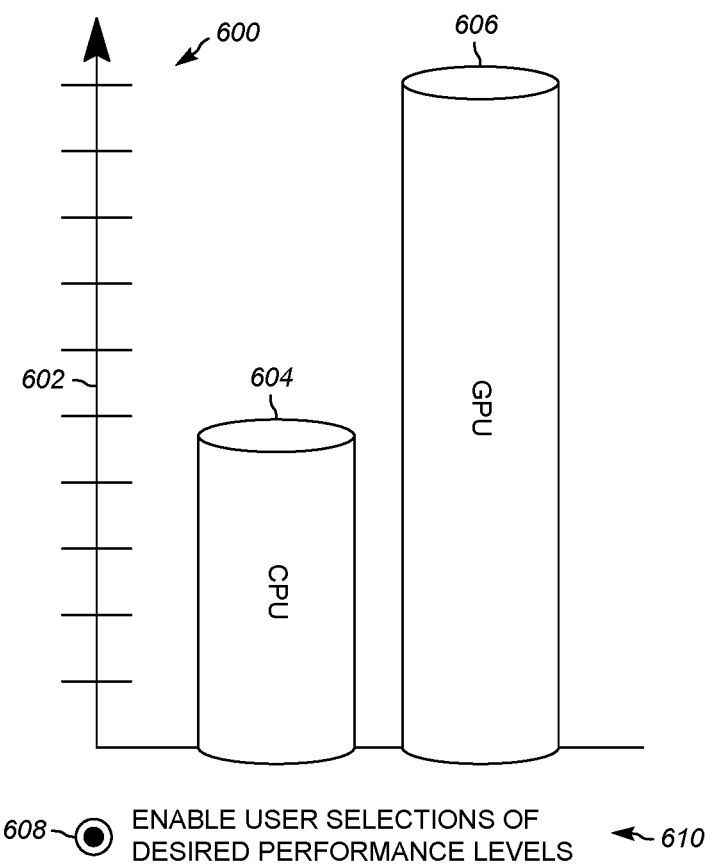
FIG. 6 illustrates another example of a graphical user interface that may be provided by a multiprocessor user selection-based relative or independent performance level controller, in accordance with another example set forth in the disclosure.

FIG. 6 illustrates another example GUI 600, which may be used to implement the GUI 130 in other embodiments. The GUI 600 includes a performance level selection axis 602; a first processor user-selectable component 604 illustrated as, by way of example, a CPU control bar; a second processor user-selectable component 606 illustrated as, by way of example, a GPU control bar; an enable option 608 similar to the enable option 510, such as a radio button; and accompanying text 610 such as, in this example, "ENABLE USER SELECTIONS OF DESIRED PERFORMANCE LEVELS." The first and second processor user-selectable components 604 and 606 may each be movable between positions corresponding to a 0 percent desired performance level and a 100 percent desired performance level. Moreover, the GUI 600 allows the user-selectable components 604 and 606 to be moved independently of one another. In the illustrated example, the first processor user-selectable component 604 indicates a desired CPU performance level of 50 percent, and the second processor user-selectable component 606 indicates a desired GPU performance level of 100 percent.

The user interface providing logic 202 may alternatively provide a user interface that allows one or more user selections of the desired performance levels of the first and second processors 104 and 106 to be made in any other suitable manner. For example, the user interface providing logic 202 may provide a user interface that allows the one or more user selections to be made by way of user entry of numerical data, by spoken input, etc. In the case of spoken input and in other examples, the user interface may not be a GUI but may instead be provided, for example, by providing appropriate prompts and accepting appropriate inputs using the I/O devices 126. Additionally, if desired, the user interface providing logic 202 may communicate with the performance level management logic 204 to receive information about the performance levels of the first and second processors 104 and 106 as controlled by the performance level management logic 204 and provide an indication of this information via the user interface.

As shown in block 302, the method further includes, during normal operation of the computing device 100, controlling a performance level of the first processor 104 and a performance level of the second processor 106 in response to the one or more user selections via the user interface of the desired performance levels. For example, the performance levels may be controlled in response to one user selection when the user interface provided is the user interface 500, and in response to two user selections when the user interface provided is the user interface 600.

More particularly, when the enable signal 218 is asserted (e.g., a logic high), upon receiving the user selection information 132, the performance level management logic 204 may generate first processor control parameter information 220 and second processor control parameter information 222 that is provided to the first and second processor control parameter logic 206 and 208, respectively. The first and second processor control parameter information 220 and 222 may include any suitable information used to cause the first and second processor control parameter logic 206 and 208 to generate signals to control the performance levels of the first and second processors 104 and 106, respectively, based on the desired performance levels indicated by the user selection information 132.

For example, the first processor control parameter information 220 may cause the first processor frequency control logic 210 to generate a first processor frequency control signal 224 and the first processor voltage control logic 212 to generate a first processor voltage control signal 226. The second processor control parameter information 222 may cause the second processor frequency control logic 214 to generate a second processor frequency control signal 228 and the second processor voltage control logic 216 to generate a second processor voltage control signal 230.

The first processor frequency and voltage control signals 224 and 226 may be provided to the first processor 104 (e.g., to first processor cores 232) in order to control the performance level of the first processor 104 based on the desired performance level of the first processor 104, and the second processor frequency and voltage control signals 228 and 230 may be provided to the second processor 106 (e.g., to second processor cores 234) in order to control the performance level of the second processor 106 based on the desired performance level of the second processor 106. Thus, the first processor frequency and voltage control signals 224 and 226 may collectively constitute the first processor performance control information 134, and the second processor frequency and voltage control signals 228 and 230 may collectively constitute the second processor performance control information 136.

The desired performance levels of the first and second processors 104 and 106 may correspond to discrete performance states (as indicated, for example, by mapping as further discussed below), such as performance states as defined within the Advanced Configuration and Power Interface (ACPI) specification. The ACPI specification is a power management specification as known in the art. As further known in the art, a performance state of a processor may correspond to particular control parameters such as an operating frequency and an operating voltage of the processor. Thus, the first and second processor frequency and voltage control signals 224-230 may control the performance levels of the first and second processors 104 and 106 by controlling the operating frequency and voltage of the processors so that these parameters correspond to the performance states that in turn correspond to the desired performance levels.

The first processor frequency and voltage control signals 224 and 226 and the second processor frequency and voltage control signals 228 and 230 may control the performance levels of the first processor and the second processor 104 and 106 over continuous ranges if desired. In such examples, one or more voltage-controlled oscillators (VCOs) or other suitable feature(s) may be implemented within the first and second processor frequency control logic 210 and 214 or in any other suitable location, such as another suitable location within the processor subsystem 108. Implementation of the one or more VCOs and/or other suitable component(s)/feature(s) may assist in the generation of the first and second processor frequency control signals 224 and 228 over continuous ranges so as to control the performance levels over continuous ranges.

The performance level management logic 204 may also generate the first and second processor control parameter information 220 and 222 based on feedback information that includes the first and second processor frequency control signals 224 and 228 and the first and second processor voltage control signals 226 and 230. The feedback information may also include information indicating loadings of each of the first and second processor 104 and 106. For example, the first processor 104 may include first processor activity detection logic 236, such as direct memory access control (DMAC)/dynamic random access memory (DRAM) activity detection logic, which may detect a loading of the first processor 104 caused by executing instructions and/or instructions in a queue (not shown). The first processor activity detection logic 236 may provide first processor loading information 238 to the performance level management logic 204.

Similarly, the second processor 106 may include second processor activity detection logic 240, such as inverse discrete cosine transform (iDCT) function detection logic when the second processor 106 is a GPU, which may detect a loading of the second processor 106 caused by executing instructions and/or instructions in a queue (not shown). The second processor activity detection logic 240 may provide second processor loading information 242 to the performance level management logic 204. Each of the first processor activity detection logic 236 and the second processor activity detection logic 240, and any other controllers and logic described herein, may be implemented as hardware; as software executing on the first processor 104 or the second processor 106, respectively; as the first processor 104 or the second processor 106, respectively, in combination with executable code stored in memory; or in any other suitable manner.

The performance level management logic 204 may use the feedback information to determine the first and second processor control parameter information 220 and 222 by, for example, using the frequency and voltage control signals 224-230 to perform suitable calculations to determine how far off the actual performance levels of the first and second processors 104 and 106 are from the desired performance levels. This determination may include a determination of an amount of time that is to be taken to reach the desired performance levels and may thus affect the subsequent generation of the frequency and voltage control signals 224-230. Additionally, the first and second processor loading information 238 and 242 may be used to, for example, effectively override one or more of the desired performance levels by increasing the performance level of at least one of the first and second processors 104 and 106 relative to the corresponding desired performance level(s) when the first and/or second processor loading information 238 and/or 242 indicates that the corresponding desired performance level(s) are too low for the loading(s) of the processors 104 and/or 106.

As discussed in more detail below, the performance level management logic 204 may also control the performance levels of the first and second processors 104 and 106 based on the output(s) of the one or more thermal sensors 112, such as a temperature measurement of a chassis of the computing device 100. Additionally, the control of the performance levels may be based on the output(s) of the one or more thermal sensors 113 of the processor subsystem 108, such as temperature measurement(s) from a CPU thermal sensor, a GPU thermal sensor, and/or an APU thermal sensor. Further still, the control of the performance levels may be based on the output(s) of the memory 110, such as parameters stored in on-chip registers or off-chip registers, as further discussed below.

Turning back to FIG. 4, another example method for controlling power consumption associated with a computing device having a first processor and a second processor that are configured to perform different types of operations includes providing a user interface that allows one or more user selections (block 300). As shown in block 400, the method further includes, during normal operation of the computing device 100, controlling a performance state of the first processor 104 and a performance state of the second processor 106 in response to the one or more user selections via the user interface of the desired performance levels such that a combined power consumption level associated with both the first processor 104 and the second processor 106 (e.g., a total power dissipated by an integrated circuit die on which the first and second processors 104 and 106 are implemented) is caused to be within a combined maximum power consumption level associated with both the first processor 104 and the second processor 106.

For example, where the first and second processors 104 and 106 are implemented within the same integrated circuit die (e.g., as an APU), the integrated circuit die has a die-level thermal design power (TDP) (or "rated TDP") as noted above, and the combined maximum power consumption level associated with both the first and second processors 104 and 106 may be the die-level TDP, such as, for example, the maximum allowable power dissipation of the integrated circuit die.

Figure 7:
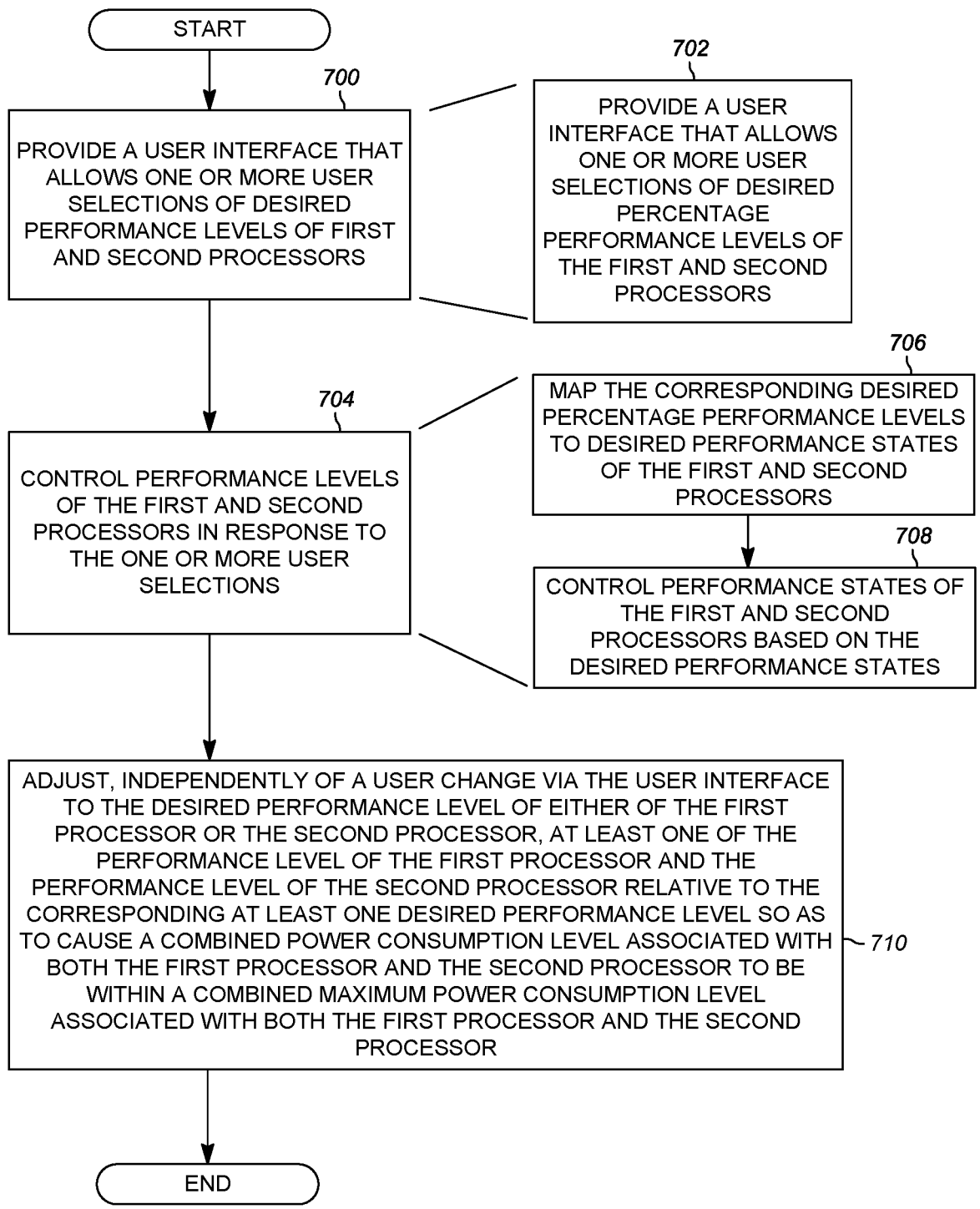
FIG. 7 is a flow chart illustrating another example of a method for controlling power consumption associated with a computing device having a first processor and a second processor that are configured to perform different types of operations, in accordance with an example set forth in the disclosure.

Referring now to FIG. 7, which is a flow chart of another example method of controlling power consumption associated with a computing device having a first processor and a second processor that are configured to perform different types of operations, the method may include providing a user interface that allows one or more user selections of desired performance levels of the first and second processors 104 and 106, as shown in block 700. If desired, the block 700 may include implementing the block 300. The block 700 may also or alternatively include implementing block 702. As shown in the block 702, providing the user interface may include providing a user interface that allows one or more user selections of desired percentage performance levels of the first and second processors 104 and 106. The block 702 may be implemented by, for example, the user interface providing logic 202 providing the GUI 500 or the GUI 600.

As shown in block 704, the method may further include the performance level management logic 204 controlling performance levels of the first and second processors 104 and 106 in response to the one or more user selections. If desired, the block 704 may include implementing the block 302. Additionally, if desired, the block 704 may include implementing at least some of the actions used to implement the block 400. Furthermore, the block 704 may also or alternatively include implementing blocks 706 and 708. As shown in the blocks 706 and 708, controlling the performance levels of the first and second processors 104 and 106 in response to the one or more user selections may include: (i) mapping the corresponding desired percentage performance levels to desired performance states of the first and second processors 104 and 106 (block 706), as further described below; and (ii) controlling performance states of the first and second processors 104 and 106 based on the desired performance states (block 708).

As shown in block 710, the method may further include the performance level management logic 204 adjusting, independently of a user change via the user interface to the desired performance level of either of the first processor 104 or the second processor 106, at least one of the performance level of the first processor 104 and the performance level of the second processor 106 relative to the corresponding at least one desired performance level so as to cause a combined power consumption level associated with both the first processor 104 and the second processor 106 (e.g., a total power dissipated by an IC die on which the first and second processors 104 and 106 are implemented) to be within a combined maximum power consumption level associated with both the first processor 104 and the second processor 106 (e.g., a die-level TDP). For example, the performance level management logic 204 may adjust the at least one performance level (which may include adjusting a corresponding performance state) in response to an overcurrent or overtemperature condition, each of which may be an indication that a die-level TDP is likely being exceeded or is likely going to be exceeded if at least one performance level is not adjusted.

The adjustment of the at least one performance level is relative to the desired performance level(s) of the first and/or second processors 104 and/or 106 in that the actual performance level(s) of the first and/or second processors 104 and/or 106 is or are controlled to be other than that which the user selects via the user interface in order to remove the overcurrent or overtemperature condition. The performance level management logic 204 may maintain its adjustment and/or make further adjustments until the combined power consumption level is within the combined maximum power consumption level, as further described below with reference to, for example, FIGS. 9 and 10.

Figure 8:
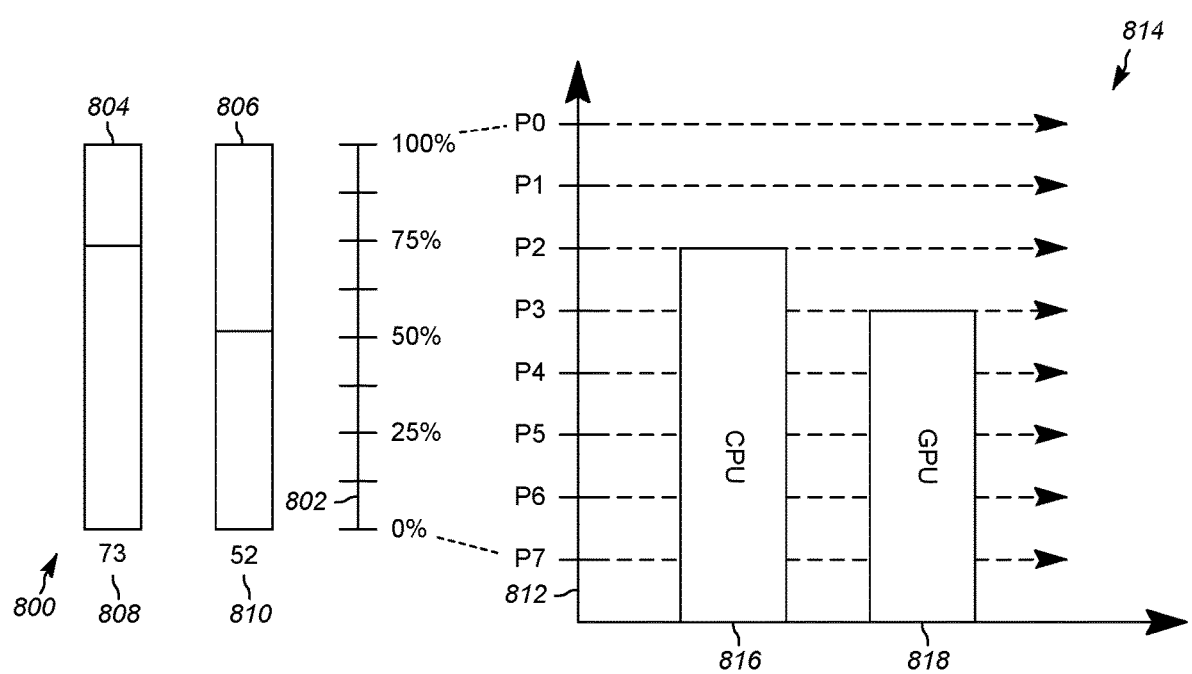
FIG. 8 shows a representation of how desired percentage performance levels selected via a graphical user interface may be mapped to corresponding desired performance states, in accordance with yet another example set forth in the disclosure.

Referring first to FIG. 8, however, FIG. 8 shows a representation of how desired percentage performance levels selected via a GUI 800 may be mapped to corresponding desired performance states (e.g., block 706). The GUI 800 may be the same as or similar to the GUI 600, in some examples. The GUI 800 includes a performance level selection axis 802; a first processor user-selectable component 804 illustrated as a control bar; and a second processor user-selectable component 806 illustrated as another control bar. While not shown in FIG. 8, an enable option and accompanying text similar to those discussed with respect to FIGS. 5 and 6 may also be included. As shown in FIG. 8, the first processor user-selectable component 804 has been used to select a desired percentage performance level 808 for the first processor 104, which is 73 percent in this example; and the second processor user-selectable component 806 has been used to select a desired percentage performance level 810 for the second processor 106, which is 52 percent in this example.

The performance level management logic 204 may map the desired percentage performance levels to performance states of each processor (which may at times be referred to as "power states" or as "P-states"). For example, as shown on performance state axis 812, a set of frequency and voltage parameters 814 may correspond to the performance states. For example, a frequency F0 and a voltage V0 may correspond to a performance state P0, a frequency F1 and a voltage V1 may correspond to a performance state P1, etc. In this example, P0 may be the highest performance state in that P0 includes the highest frequency and voltage parameters F0 and V0 as compared to other performance states, and P7 may be the lowest performance state. It will be appreciated that depending upon the particular processors used in the computing device, the particular processors may have different performance states at which they are capable of operating. For example, some processors may not be capable of operating at eight different performance states such as the performance states P0 through P7.

The performance level management logic 204 may map the first processor desired percentage performance level 808 of 73 percent to first processor performance state P2, as shown by first processor (e.g., CPU) performance state bar 816. The performance level management logic 204 may also map the second processor desired percentage performance level 810 of 52 percent to second processor performance state P3, as shown by second processor (e.g., GPU) performance state bar 818. The illustrated mapping is shown for ease of explanation and understanding and, if desired, need not be displayed or otherwise provided to the user as part of the user interface. In other embodiments, the right-hand portion of FIG. 8 may be provided as the user interface or as a portion thereof, and the user may control the performance state bars 816 and 818 so as to directly select the desired performance states instead of indicating the desired performance states by selecting desired percentage performance levels that are then mapped to desired performance states.

In situations where the user selects desired percentage performance levels that are then mapped, the mapping may be performed in any suitable manner, such as by a lookup table, an "on-the-fly" mathematical calculation by the performance level management logic 204 of which performance state the desired percentage performance level is closest to based on assigning percentages to each performance state (e.g., with 0 percent assigned to P7 and 100 percent assigned to P0), or in any other suitable manner.

Figure 9:
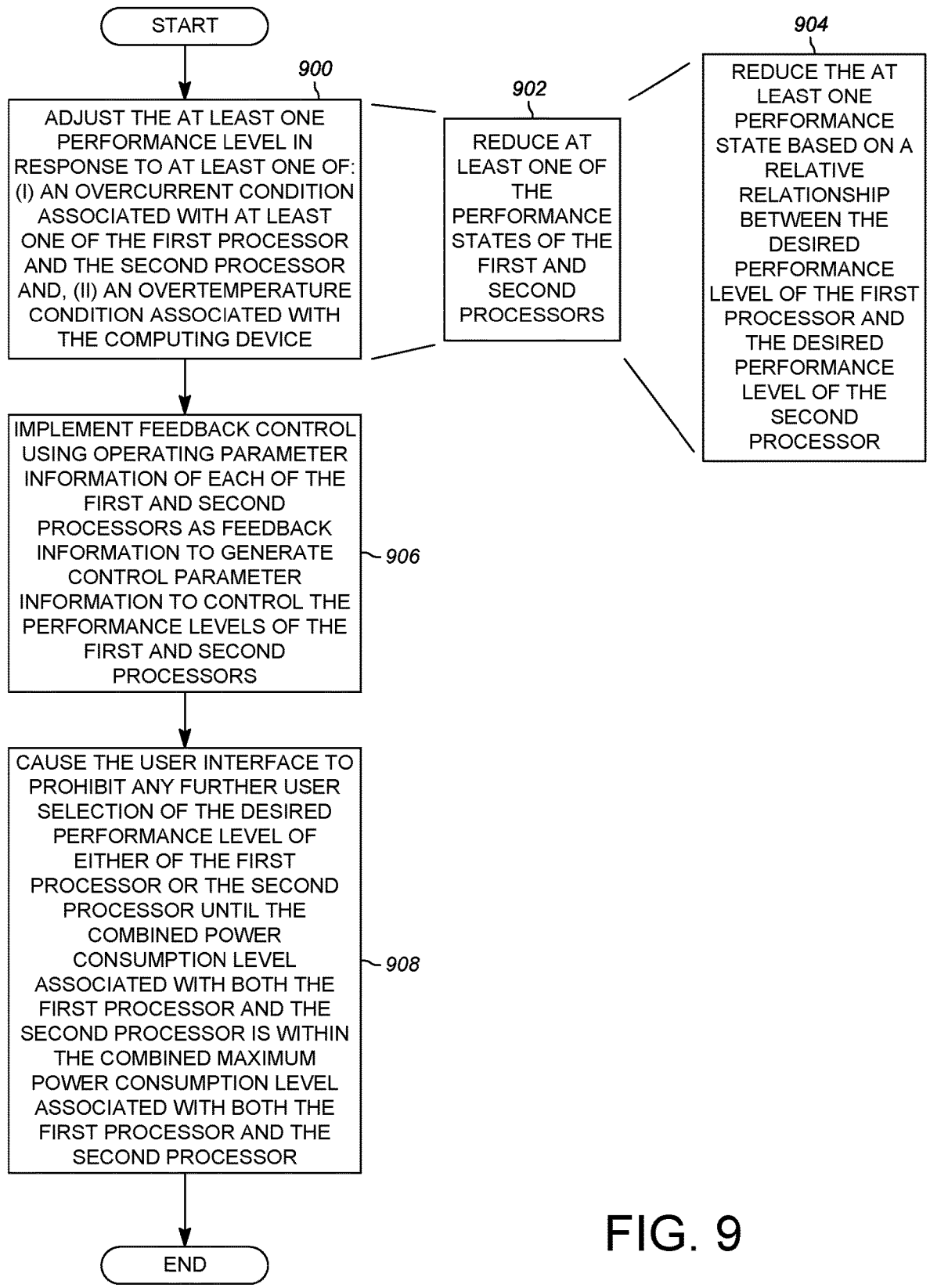
FIG. 9 is a flow chart illustrating yet another example method of controlling power consumption associated with a computing device having a first processor and a second processor that are configured to perform different types of operations, in accordance with an example set forth in the disclosure.

FIG. 9, which is a flow chart illustrating yet another example method of controlling power consumption associated with a computing device having a first processor and a second processor that are configured to perform different types of operations, shows, for example, further details of an implementation of the block 710 of FIG. 7. As shown at block 900, the method includes adjusting the at least one performance level (which may include adjusting a corresponding performance state) in response to at least one of: (i) an overcurrent condition associated with at least one of the first processor 104 and the second processor 106, and (ii) an overtemperature condition associated with the computing device 100.

Implementing the block 900 may include implementing a block 902 by reducing at least one of the performance states of the first and second processors 104 and 106 in order to cause the combined power consumption level to be within the combined maximum power consumption level. Implementing the block 902 may include implementing a block 904 when, for example, the user interface providing logic 202 provides a user interface that allows user selections of the desired performance levels to be made independently of one another. In particular, as shown in the block 904, implementing the block 902 may include reducing the at least one performance state based on a relative relationship between the desired performance level of the first processor 104 and the desired performance level of the second processor 106. Thus, where the desired percentage performance level of the first processor 104 is 73 percent and the desired percentage performance level of the second processor 106 is 52 percent as in FIG. 8, the performance level management logic 204 may reduce the performance state of the second processor 106 more than the performance level management logic 204 reduces the performance state of the first processor 104, or may reduce the performance state of the second processor 106 for a longer time, etc.

As shown in block 906, the method may include implementing feedback control using operating parameter information of each of the first and second processors 104 and 106 as feedback information to generate control parameter information to control the performance levels of the first and second processors 104 and 106. The operating parameter information may include, for example, operating frequencies, operating voltages, and loading information for each of the first and second processors 104 and 106, as discussed above.

Figure 10:
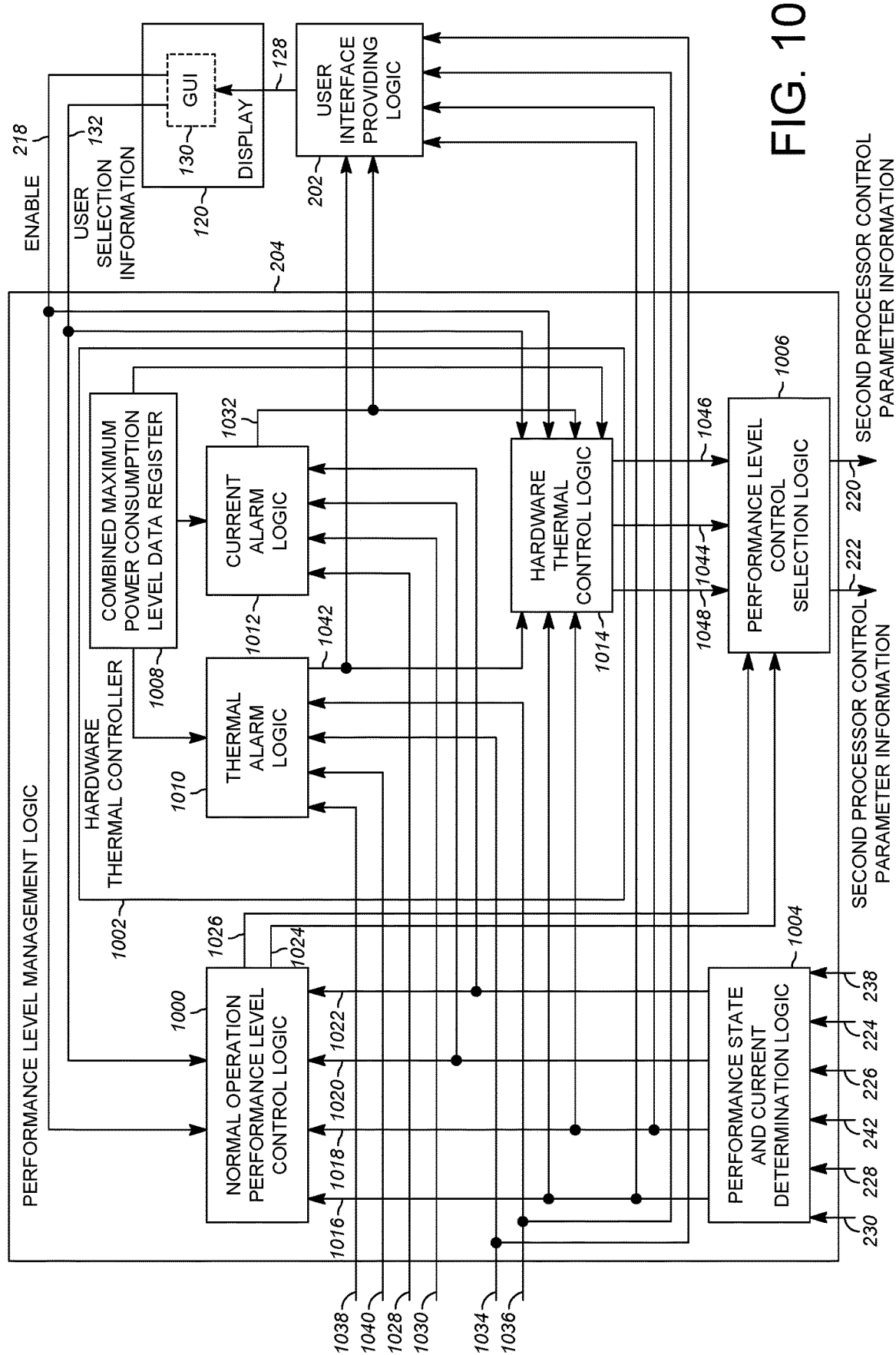
FIG. 10 is a functional block diagram illustrating an example implementation of performance level management logic of the multiprocessor user selection-based relative or independent performance level controller, in accordance with yet another example set forth in the disclosure.

FIG. 10 is a functional block diagram illustrating in more detail an example implementation of the performance level management logic 204. The performance level management logic 204 may include normal operation performance level control logic 1000, a hardware thermal controller 1002, performance state and current determination logic 1004, and performance level control selection logic 1006. The hardware thermal controller 1002 may include a combined maximum power consumption level data register 1008, which may store data indicating the combined maximum power consumption level associated with both the first and second processors 104 and 106 (e.g., a die-level TDP). The hardware thermal controller 1002 may also include thermal alarm logic 1010, current alarm logic 1012, and hardware thermal control logic 1014.

The performance state and current determination logic 1004 may receive the first and second processor frequency control signals 224 and 228, the first and second processor voltage control signals 226 and 230, and the first and second processor loading information 238 and 242 in order to determine the actual performance state of each of the first and second processors 104 and 106 and the current of each of the first and second processors 104 and 106 based on, for example, suitable calculations known in the art.

Based on these determinations, the performance state and current determination logic 1004 may provide first and second processor performance state signals 1016 and 1018 to the normal operation performance level control logic 1000, the hardware thermal control logic 1014, and the user interface providing logic 202. Additionally, if desired, the performance state and current determination logic 1004 may provide first and second processor current signals 1020 and 1022 to the normal operation performance level control logic 1000 and the current alarm logic 1012.

In one example, when the enable signal 218 is asserted, the normal operation performance level control logic 1000 receives the user selection information 132 and generates first and second processor normal operation control parameter information 1024 and 1026 based on the first and second processor performance state signals 1016 and 1018 indicating the actual performance states of the first and second processors 104 and 106 and further based on the user selection information 132. For example, the normal operation performance level control logic 1000 may determine the first and second processor normal operation control parameter information 1024 and 1026 based on suitable calculations that indicate, for example, what frequency and voltage for each of the first and second processors 104 and 106 are needed to achieve the desired performance levels as indicated by the user selection information 132 given that the actual (e.g., present) performance states of the first and second processors 104 and 106 are as indicated by the signals 1016 and 1018. If desired, such calculations may take into account the currents of the first and second processors 104 and 106 as indicated by the first and second processor current signals 1020 and 1022, which may in turn reflect the loadings on the first and second processors 104 and 106.

The normal operation performance level control logic 1000 provides the first and second processor normal operation control parameter information 1024 and 1026 to the performance level control selection logic 1006 to control the performance levels of the first and second processors 104 and 106 in the absence of an overcurrent or overtemperature condition. The first and second processor normal operation control parameter information 1024 and 1026 may be selected as the first and second processor control parameter information 220 and 222 when no overcurrent or overtemperature condition exists, as described below.

The memory 110 (not shown in FIG. 10) may store and provide first processor maximum current data 1028 and second processor maximum current data 1030 to the current alarm logic 1012. The first and second processor maximum current data 1028 and 1030, in this example, indicate maximum allowable operating currents of the first and second processors, respectively. The current alarm logic 1012 may compare the first processor current as indicated by the first processor current signal 1020 with the maximum allowable current indicated by the first processor maximum current data 1028, and may compare the second processor current as indicated by the second processor current signal 1022 with the maximum allowable current indicated by the second processor maximum current data 1030. If either or both processor currents exceed the current(s) indicated by processor maximum current data 1028 and/or 1030, the current alarm logic 1012 may assert a current alarm signal 1032 to indicate an overcurrent condition and may provide the current alarm signal 1032 to the hardware thermal control logic 1014.

The current alarm signal 1032 may either be asserted immediately or after a particular period of time for which either or both processor currents exceed the respective current(s) indicated by the processor maximum current data 1028 and/or 1030. The particular period of time may vary depending on, for example, the computing device 100 or processor subsystem 108 being used, and the current alarm logic 1012 may determine the particular period of time using registers (not shown) within, for example, the current alarm logic 1012.

Additionally, the thermal sensor(s) 112 (not shown in FIG. 10) may provide chassis temperature data 1034 indicative of a temperature of a chassis of the computing device 100 to the thermal alarm logic 1010. The thermal sensor(s) 113 (not shown in FIG. 10) may also provide processor subsystem temperature data 1036 indicative of a temperature of the processor subsystem 108 to the thermal alarm logic 1010, though as noted above the thermal sensor(s) 112 and 113 may also or alternatively measure other suitable temperatures. The chassis temperature data 1034 and the processor subsystem temperature data 1036, along with the first and second processor performance state signals 1016 and 1018, may also be provided to the user interface providing logic 202 such that these data may be provided to a user via the user interface (e.g., the GUI 130), thus allowing the user greater ability to monitor the operation of the computing system 100 when selecting desired performance levels.

In the above example, the memory 110 may store and provide chassis maximum temperature data 1038 indicative of a maximum chassis temperature to the thermal alarm logic 1010, and may also store and provide processor subsystem maximum temperature data 1040 indicative of a maximum processor subsystem temperature to the thermal alarm logic 1010. The thermal alarm logic 1010 may compare the chassis temperature data 1034 to the chassis maximum temperature data 1038, and may compare the processor subsystem temperature data 1036 to the processor subsystem maximum temperature data 1040 to determine whether an overtemperature condition is associated with the computing device 100 and that a thermal alarm signal 1042 should therefore be asserted and provided to the hardware thermal control logic 1014.

In some cases, such as depending upon the particular computing device 100 and/or processor subsystem 108, one of the chassis temperature or the processor subsystem temperature may exceed the corresponding maximum temperature and the thermal alarm signal 1042 may nevertheless not be generated based on, for example, the temperature of the other one of the chassis or the processor subsystem, how long the chassis or processor subsystem temperature exceeds its maximum, etc.

In any event, when either or both of the current alarm signal 1032 and/or the thermal alarm signal 1042 is asserted, the hardware thermal control logic 1014 may adjust the performance level of at least one of the first processor 104 and the second processor 106, such as by reducing at least one of the corresponding performance levels (which, as discussed above, may be performed by reducing at least one of the corresponding performance states). The hardware thermal control logic 1014 may generate and provide a first processor performance level adjustment signal 1044 and a second processor performance level adjustment signal 1046 to the performance level control selection logic 1006.

The hardware thermal control logic 1014 may generate and provide the first and second processor performance level adjustment signals 1044 and 1046 as a result of suitable calculations based on, for example, the actual performance states of the first and second processors 104 and 106 as indicated by the signals 1016 and 1018 and based on, for example, the die-level TDP as indicated by the combined maximum power consumption level data register 1008. Such calculations may indicate how much either or both performance levels need to be adjusted (e.g., reduced) and/or for how long either or both performance levels need to be reduced in order to cause the combined power consumption level associated with both the first and second processors 104 and 106 to be within, for example, the die-level TDP.

If desired, when the enable signal 218 is asserted and provided to the hardware thermal control logic 1014, the hardware thermal control logic 1014 may perform the calculations to generate and provide the first and second processor performance level adjustment signals 1044 and 1046 further based on the user selection information 132 indicative of the desired performance levels of the first and second processors 104 and 106. In this manner, the hardware thermal control logic 1014 may, among other advantages, generate and provide the first and second processor performance level adjustment signals 1044 and 1046 so as to adjust the performance levels of the first and second processors 104 and 106 based on a relative relationship between the desired performance levels of the first and second processors 104 and 106. The adjustment of the performance levels may be performed by adjusting performance states that correspond to particular operating frequencies and operating voltages, for example.

The first and second processor performance level adjustment signals 1044 and 1046 may be selected as the first and second processor control parameter information 220 and 222 when an overcurrent and/or overtemperature condition exists. In particular, the hardware thermal control logic 1014 may assert a hardware thermal control (HTC) override signal 1048 to the performance level control selection logic 1006 whenever one or both of the current alarm signal 1032 and the thermal alarm signal 1042 are asserted. In this example, when the HTC override signal 1048 is asserted, the performance level control selection logic 1006 selects the first and second processor performance level adjustment signals 1044 and 1046 as the first and second processor control parameter information 220 and 222 in order to adjust the performance levels of the first and second processors 104 and 106 (which may be performed by adjusting performance states) as described above.

When the HTC override signal 1048 is not asserted, the performance level control selection logic 1006 selects the first and second processor normal operation control parameter information 1024 and 1026 as the first and second processor control parameter information 220 and 222 in order to control the performance levels (which may be performed by controlling performance states) of the first and second processors 104 and 106 as described above.

Referring back to FIG. 9, as shown in block 908, the method may further include causing the user interface to prohibit any further user selection of the desired performance levels of either of the first processor 104 or the second processor 106 until the combined power consumption level associated with both the first and second processors 104 and 106 is within the combined maximum power consumption level associated with both the first and second processors 104 and 106 (e.g., the rated TDP). For example, with reference to FIG. 10, when the current alarm signal 1032 and/or the thermal alarm signal 1042 is asserted, the current alarm signal 1032 and/or the thermal alarm signal 1042 is provided to the user interface providing logic 202. In response, the user interface providing logic 202 may include, in the user interface information 128, information causing a message to be provided via the user interface indicating that any further user selection of a desired performance level or levels is prohibited during the overtemperature and/or overcurrent condition, and/or causing the user interface to become unresponsive to any attempted user selection of a desired performance level or levels during the overtemperature and/or overcurrent condition.

While the various functional block diagrams and flow charts shown and described herein have been shown and described with particular configurations and with the blocks of the flow charts in a particular order, it will be appreciated that suitable variations may be made. For example, one or more blocks of a flow chart may be omitted if desired, may be performed during the same or overlapping periods of time, may be performed in a different suitable order, etc.

Figure 11:
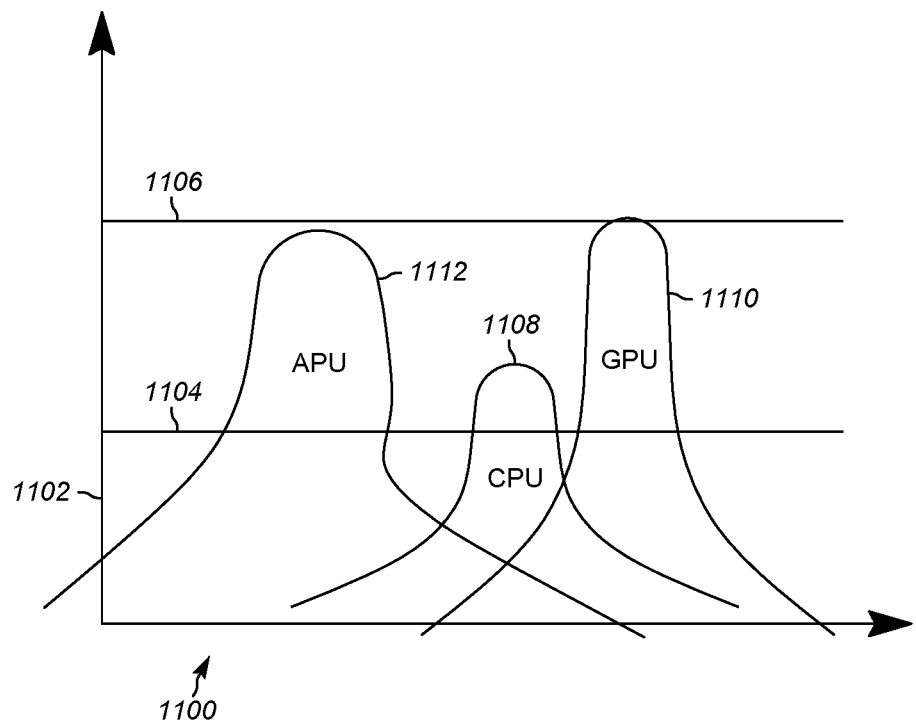
FIG. 11 illustrates a graphical indication of control of power consumption associated with a computing device having first and second processors that are configured to perform different types of operations, in accordance with still another example set forth in the disclosure.

FIG. 11 illustrates a graphical indication 1100 of control of power consumption associated with a computing device having first and second processors (e.g., the first and second processors 104 and 106) that are configured to perform different types of operations, such as a CPU and a GPU. A power axis 1102 indicates PL1 (power limit 1) 1104, which is the power limit of an individual one of the processors 104 or 106. The power axis 1102 further indicates PL2 (power limit 2) 1106, which is the die-level TDP of an APU, in this example. FIG. 11 further illustrates a CPU power curve 1108, a GPU power curve 1110, and an APU power curve 1112. As shown in FIG. 11, both the CPU and GPU power curves 1108 and 1110 exceed PL1 1104 for an individual one of the CPU or GPU. Additionally, the GPU power curve 1110 exceeds PL2 1106 for the APU, which, as discussed above, may result in an overtemperature or overcurrent condition being detected within the APU and the first and second processor performance level adjustment signals 1044 and 1046 being provided as the first and second processor control parameter information 220 and 222. The result of such adjustment is, in one example, the APU power curve 1112, which shows an APU power within PL2 1106.

Figure 12:
FIG. 12 is a block diagram illustrating one example of an integrated circuit fabrication system.

As shown in FIG. 12, an integrated circuit fabrication system 1200 is shown which may include access to memory 1202 which may be in any suitable form and any suitable location accessible via the web, accessible via hard drive or any other suitable way. The memory 1202 is a non-transitory computer readable medium such as but not limited to RAM, ROM, and any other suitable memory. The IC fabrication system may be one or more work stations that control a wafer fabrication to build integrated circuits. The memory 1202 may include thereon instructions that when executed by one or more processors causes the integrated circuit fabrication system to fabricate an integrated circuit that includes the logic and structure described herein.

The disclosed integrated circuit designs may be employed in any suitable apparatus including but not limited to, for example, video game consoles, handheld devices such as smart phones, tablets, portable devices such as laptops, desktop computers, high definition televisions, printers or copiers, or any other suitable device. Such devices may include for example, a display that is operatively coupled to the integrated circuit where the integrated circuit may include, for example, a CPU and a GPU, such as a CPU and a GPU integrated within an APU, or any other suitable integrated circuit(s) that provides image data for output on the display. Such an apparatus may employ the integrated circuits as noted above including the user interface providing logic; the performance level management logic; memory including, for example, registers; the thermal sensor(s), etc. as described as well as one or more of the described configurations.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure may be created using such integrated circuit fabrication systems. In such a system, the computer readable medium stores instructions executable by one or more integrated circuit design systems that causes the one or more integrated circuit design systems to produce an integrated circuit. The integrated circuit includes, for example, the user interface providing logic; the performance level management logic; memory including, for example, registers; the thermal sensor(s); etc. in order to, among other things, allow one or more user selections via a user interface of desired performance levels (e.g., desired percentage performance levels) of first and second processors that are configured to perform different types of operations and in order to control the performance levels of the first and second processors in response to the one or more user selections via the user interface.

Among other advantages, for example, one or more of the above embodiments allow a user to more directly specify, via a user interface, desired performance levels for each of a first and second processor of a computing device that are configured to perform different types of operations; and allow the user's specified desired performance levels to be realized. One or more of the above embodiments also maintain operating conditions of the computing device, such as a rated TDP of a processor subsystem (e.g., APU) within acceptable limits while still accounting for the user's desired performance levels by, for example, adjusting the processor performance levels based on a relative relationship between the desired performance levels.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method for controlling power consumption associated with a computing device having a first processor and a second processor, the first processor and the second processor being configured to perform different types of operations, the method comprising:

during normal operation of the computing device, providing a user interface that allows a first user selection of a desired performance level of the first processor and a second user selection of a desired performance level of the second processor, the second user selection being made independently of the first user selection;

during normal operation of the computing device, directly adjusting a performance level of the first processor and a performance level of the second processor to the desired performance levels specified by the first user selection and the second user selection via the user interface; and during an overcurrent or an overtemperature condition of the computing device, directing the user interface to be unresponsive to the first user selection and the second user selection until a combined power consumption level associated with the first processor and the second processor is within a combined maximum power consumption level associated with the first processor and the second processor.

2. The method of claim 1, wherein providing the user interface comprises providing the user interface that allows the first and second user selections of the desired performance levels to include one or more user selections of at least one of a desired performance state of the first processor and a desired performance state of the second processor;
wherein directly adjusting at least one of the performance level of the first processor and the performance level of the second processor comprises controlling at least one of the performance state of the first processor and the performance state of the second processor; and
wherein the performance state of the first processor corresponds to particular control parameters of the first processor and the performance state of the second processor corresponds to particular control parameters of the second processor.

3. The method of claim 2, wherein providing the user interface comprises providing the user interface such that the first and second user selections via the user interface are one or more user selections of desired percentage performance levels; and
wherein directly adjusting the at least one of the performance states of the first and second processors comprises mapping the corresponding desired percentage performance levels to desired performance states of at least one of the first and second processors and controlling the performance states of at least one of the first and second processors based on the desired performance states of the first and second processors.

4. The method of claim 1, comprising adjusting, independently of a user change via the user interface to the desired performance level of either of the first processor or the second processor, at least one of the performance level of the first processor and the performance level of the second processor relative to the corresponding at least one desired performance level so as to cause the combined power consumption level associated with the first processor and the second processor to be within the combined maximum power consumption level associated with the first processor and the second processor.

5. The method of claim 4, wherein adjusting the at least one performance level is performed in response to at least one of: (i) an overcurrent condition associated with at least one of the first processor and the second processor, and (ii) an overtemperature condition associated with the computing device.

6. The method of claim 4, wherein the first processor is a central processing unit (CPU) of the computing device, the second processor is a graphics processing unit (GPU) of the computing device, and the CPU and the GPU are implemented within an integrated circuit die having a die-level thermal design power (TDP); and wherein the combined maximum power consumption level associated with the first processor and the second processor is the die-level TDP.

7. The method of claim 4, wherein adjusting the at least one performance level comprises implementing feedback control using operating parameter information of each of the first and second processors as feedback information to generate control parameter information to control the performance level of the first processor and the performance level of the second processor.

8. The method of claim 7, wherein the control parameter information includes voltage and frequency control information for the first processor and voltage and frequency control information for the second processor.

9. An apparatus comprising:
user interface providing logic of a computing device operative to provide a user interface that allows, during normal operation of the computing device, a first user selection of a desired performance level of the first processor and a second user selection of a desired performance level of the second processor, the second user selection being made independently of the first user selection; and
performance level management logic operatively coupled to the user interface providing logic and operative to:
during normal operation of the computing device, directly adjusting a performance level of the first processor and a performance level of the second processor to the desired performance levels specified by the first user selection and the second user selection via the user interface; and
during an overcurrent or an overtemperature condition of the computing device, directing the user interface to be unresponsive to the first user selection and the second user selection until a combined power consumption level associated with the first processor and the second processor is within a combined maximum power consumption level associated with the first processor and the second processor.

10. The apparatus of claim 9, wherein the performance level management logic is operative to adjust, independently of a user change via the user interface to the desired performance level of either of the first processor or the second processor, at least one of the performance level of the first processor and the performance level of the second processor relative to the corresponding at least one desired performance level so as to cause the combined power consumption level associated with the first processor and the second processor to be within the combined maximum power consumption level associated with the first processor and the second processor.

11. The apparatus of claim 10, wherein the performance level management logic is operative to:
determine that an overtemperature condition exists within the computing device by determining at least one of: (i) a first thermal sensor indicates that a temperature on a chassis of the computing device exceeds a maximum chassis temperature, and (ii) a second thermal sensor indicates that a temperature of at least one of a central processing unit (CPU) and a graphics processing unit (GPU) exceeds a maximum temperature of the at least one of the CPU and the GPU; and
adjust the at least one performance level in response to determining that the overtemperature condition exists within the computing device.

12. The apparatus of claim 10, wherein the performance level management logic is operative to:
determine that an overcurrent condition is associated with at least one of the first processor and the second processor using at least one of: (i) indications of a voltage level, an operating frequency, and a loading associated with the first processor, and (ii) indications of a voltage level, an operating frequency, and a loading associated with the second processor; and
adjust the at least one performance level in response to determining that the overcurrent condition is associated with the at least one processor.

13. The apparatus of claim 10, wherein the performance level management logic is operative to adjust the at least one performance level based on a relative relationship between the desired performance level of the first processor and the desired performance level of the second processor.

14. The apparatus of claim 10, comprising the first processor and the second processor, wherein the first processor is a central processing unit (CPU) of the computing device, the second processor is a graphics processing unit (GPU) of the computing device, and the CPU and the GPU are implemented within an integrated circuit die having a die-level thermal design power (TDP), wherein the die-level TDP is the combined maximum power consumption level associated with the first processor and the second processor; and wherein the performance level management logic is operative to adjust the at least one performance level so as to cause the combined power consumption level associated with the first processor and the second processor to be within the die-level TDP.

15. The apparatus of claim 14, comprising:
at least one memory operative to store parameters used by the performance level management logic to control the performance levels of the first and second processors; and
at least one thermal sensor operative to provide at least one temperature measurement associated with the computing device to the performance level management logic so that the performance level management logic is operative to control the performance levels of the first and second processors based on the at least one temperature measurement.

16. The apparatus of claim 15, comprising at least one of a display operatively coupled to the user interface providing logic and operative to provide user interface information to a user and one or more additional input/output devices operatively coupled to the user interface providing logic and operative to provide the user interface information to the user.

17. A non-transitory computer readable medium comprising executable instructions that when executed cause an integrated circuit (IC) fabrication system to fabricate one or more ICs that comprise:
user interface providing logic of a computing device operative to provide a user interface that allows, during normal operation of the computing device, a first user selection of a desired performance level of the first processor and a second user selection of a desired performance level of the second processor, the second user selection being made independently of the first user selection; and
performance level management logic operatively coupled to the user interface providing logic and operative to:
during normal operation of the computing device, directly adjusting a performance level of the first processor and a performance level of the second processor to the desired performance levels specified by the first user selection and the second user selection via the user interface; and
during an overcurrent or an overtemperature condition of the computing device, directing the user interface to be unresponsive to the first user selection and the second user selection until a combined power consumption level associated with the first processor and the second processor is within a combined maximum power consumption level associated with the first processor and the second processor.

18. The non-transitory computer readable medium of claim 17, comprising executable instructions that when executed cause the IC fabrication system to fabricate the one or more ICs such that the performance level management logic is operative to adjust, independently of a user change via the user interface to the desired performance level of either of the first processor or the second processor, at least one of the performance level of the first processor and the performance level of the second processor relative to the corresponding at least one desired performance level so as to cause the combined power consumption level associated with the first processor and the second processor to be within the combined maximum power consumption level associated with the first processor and the second processor.

19. The non-transitory computer readable medium of claim 18, comprising executable instructions that when executed cause the IC fabrication system to fabricate the one or more ICs such that the performance level management logic is operative to adjust the at least one performance level in response to at least one of: (i) an overcurrent condition associated with at least one of the first processor and the second processor, and (ii) an overtemperature condition associated with the computing device.

20. The non-transitory computer readable medium of claim 18, wherein the first processor is a central processing unit (CPU) of the computing device, the second processor is a graphics processing unit (GPU) of the computing device, and the CPU and the GPU are implemented within an integrated circuit die having a die-level thermal design power (TDP), wherein the die-level TDP is the combined maximum power consumption level associated with the first processor and the second processor; and wherein the non-transitory computer readable medium comprises executable instructions that when executed cause the IC fabrication system to fabricate the one or more ICs such that the performance level management logic is operative to adjust the at least one performance level so as to cause the combined power consumption level associated with the first processor and the second processor to be within the die-level TDP.

* * * * *